(12) United States Patent
Chen et al.

(10) Patent No.: US 9,519,097 B2
(45) Date of Patent: Dec. 13, 2016

(54) LIGHTING DEVICE AND BACKLIGHT MODULE INCLUDING THE SAME

(71) Applicant: Shenzhen China Star Optoelectronics Technology Co., Ltd., Shenzhen, Guangdong (CN)

(72) Inventors: Shihhsiang Chen, Guangdong (CN); Chengwen Que, Guangdong (CN); Dehua Li, Guangdong (CN)

(73) Assignee: Shenzhen China Star Optoelectronics Technology Co., Ltd, Shenzhen, Guangdong (CN)

( * ) Notice: Subject to any disclaimer, the term of this patent is extended or adjusted under 35 U.S.C. 154(b) by 0 days.

(21) Appl. No.: 14/765,902

(22) PCT Filed: Mar. 17, 2015

(86) PCT No.: PCT/CN2015/074386
§ 371 (c)(1),
(2) Date: Aug. 5, 2015

(87) PCT Pub. No.: WO2016/141599
PCT Pub. Date: Sep. 15, 2016

(65) Prior Publication Data
US 2016/0306100 A1    Oct. 20, 2016

(30) Foreign Application Priority Data
Mar. 11, 2015   (CN) .......................... 2015 1 0106081

(51) Int. Cl.
*F21V 8/00*   (2006.01)

(52) U.S. Cl.
CPC ........... *G02B 6/0068* (2013.01); *G02B 6/0026* (2013.01); *G02B 6/0083* (2013.01); *G02B 6/0088* (2013.01); *G02B 6/0091* (2013.01)

(58) Field of Classification Search
CPC ... G02B 6/0068; G02B 6/0026; G02B 6/0083; G02B 6/0088; G02B 6/0091
See application file for complete search history.

(56) References Cited

U.S. PATENT DOCUMENTS

| | | | |
|---|---|---|---|
| 8,564,109 B2* | 10/2013 | Watari | G02B 6/0031 257/676 |
| 2007/0081329 A1* | 4/2007 | Chua | B82Y 20/00 362/231 |
| 2008/0316767 A1* | 12/2008 | Woo | G02B 6/002 362/612 |
| 2010/0290246 A1* | 11/2010 | Kim | G02B 6/002 362/602 |

(Continued)

*Primary Examiner* — Mary Ellen Bowman
(74) *Attorney, Agent, or Firm* — Andrew C. Cheng

(57) ABSTRACT

The lighting device contains a substrate and a plurality of lighting elements arranged in at least two parallel rows on a front side of the substrate. The lighting elements of the two rows neighbor on each other. The front side of the substrate is configured so that an included angle is formed between the lighting elements of the two rows. Their light therefore converges within a Quantum Dots (QD) tube before entering a light guide plate. A backlight module incorporating the lighting device as such not only provides high saturation and high chromaticity, but also achieves greater optical coupling efficiency, thinner light guide plate and QD tube, reduced material cost and dimension.

10 Claims, 2 Drawing Sheets

(56) References Cited

U.S. PATENT DOCUMENTS

| | | | |
|---|---|---|---|
| 2012/0001538 A1* | 1/2012 | Kim | H01L 25/0753 313/512 |
| 2012/0057367 A1* | 3/2012 | Park | G02F 1/133603 362/606 |
| 2012/0293721 A1* | 11/2012 | Ueyama | G02B 6/0068 348/731 |
| 2013/0271700 A1* | 10/2013 | Nakamura | G02B 6/0026 349/65 |
| 2013/0320878 A1* | 12/2013 | Tien | G02B 6/0028 315/291 |
| 2013/0335821 A1* | 12/2013 | Robinson | G02B 6/0023 359/464 |
| 2015/0260906 A1* | 9/2015 | Li | G02B 6/0088 362/608 |

\* cited by examiner

LIGHTING DEVICE AND BACKLIGHT MODULE INCLUDING THE SAME

BACKGROUND OF THE INVENTION

1. Field of the Invention

The present invention relates to the field of liquid crystal display (LCD) techniques, and in particular to an ultra-slim lighting device and a backlight module incorporating the lighting device.

2. The Related Arts

The employment of quantum dots (QD) technology in the field of display backlight is as follows. A QD tube is positioned in front of blue light emitting diodes (LEDs). Blue light enters the QD tube and excites the dots to produce red and green light. The red and green light, blended with the incident blue light, becomes white light of high saturation and high chromaticity. The white light is introduced into the light guide plate and provides enhanced color manifestation for the liquid crystal display (LCD) device. However, in order to compensate the loss of light as it passes through the QD tube, as shown in FIG. 1, usually two rows of LEDs n1 and n2 are employed so as to increase luminous flux. Assuming that each row of the LEDs has a height D, and the gap between n1 and n2 is W, the thickness H of the light guide plate L should be at least 2D+W. In other words, this dual-row-LED design requires thicker light guide plate and QD tube, thereby increasing the weight, thickness, material, and cost of the backlight module, and contrasting the thinning tendency of LCD displays.

SUMMARY OF THE INVENTION

To address the technical issue of the prior art described above, the present invention provides a lighting device and a backlight module incorporating the lighting device where two rows of lighting elements are employed to project converged light and to achieve enhance illumination.

The lighting device contains a substrate and a plurality of lighting elements on a front side of the substrate. The lighting elements are arranged in at least two parallel rows along the length of the substrate. The lighting elements of a first row are arranged along a first edge adjacent to the lighting elements of a second row, and the lighting elements of the second row are arranged along a second edge adjacent to the lighting elements of the first row. The first and second edges neighbor on each other. The front side of the substrate is configured so that the first and second edges are sunk backward into the substrate, and as such an included angle is formed between the lighting elements of the first and second rows; and the light produced by the lighting elements therefore intersects.

Specifically, the included angle is between 90 and 150 degrees.

Specifically, the substrate has an M-shaped cross-section.

Alternatively, the interface between the lighting elements and the substrate is a curved indentation into the substrate.

Specifically, each lighting element comprises a base and a light emitting diode (LED) lamp configured on the base.

The present invention also provides a backlight module which contains a light guide plate, a plastic frame, a back plate surrounding the light guide plate and the plastic frame, a lighting device configured on the back plate facing a light incident plane of the light guide plate, and a QD tube between the lighting device and the light guide plate. The lighting device contains a substrate and a plurality of lighting elements on a front side of the substrate. The lighting elements are arranged in at least two parallel rows along the length of the substrate. The lighting elements of a first row are arranged along a first edge adjacent to the lighting elements of a second row, and the lighting elements of the second row are arranged along a second edge adjacent to the lighting elements of the first row. The first and second edges neighbor on each other. The front side of the substrate is configured so that the first and second edges are sunk backward into the substrate, and as such an included angle is formed between the lighting elements of the first and second rows; and the light produced by the lighting elements therefore intersects.

Specifically, the included angle is between 90 and 150 degrees.

Specifically, the substrate has an M-shaped cross-section.

Alternatively, the interface between the lighting elements and the substrate is a curved indentation into the substrate.

Specifically, each lighting element comprises a base and a light emitting diode (LED) lamp configured on the base.

Specifically, the substrate and the back plate are integrally formed.

By adjusting the relative position of the two rows of lighting elements so that their light converges within the QD tube before entering the light guide plate, the present invention achieves a lighting device of enhanced illumination. Then, the backlight module incorporating the lighting device not only provides high saturation and high chromaticity, but also achieves greater optical coupling efficiency, thinner light guide plate and QD tube, reduced material cost and dimension.

BRIEF DESCRIPTION OF THE DRAWINGS

To make the technical solution of the embodiments according to the present invention, a brief description of the drawings that are necessary for the illustration of the embodiments will be given as follows. Apparently, the drawings described below show only example embodiments of the present invention and for those having ordinary skills in the art, other drawings may be easily obtained from these drawings without paying any creative effort. In the drawings.

DETAILED DESCRIPTION OF THE PREFERRED EMBODIMENTS

Figure 1:
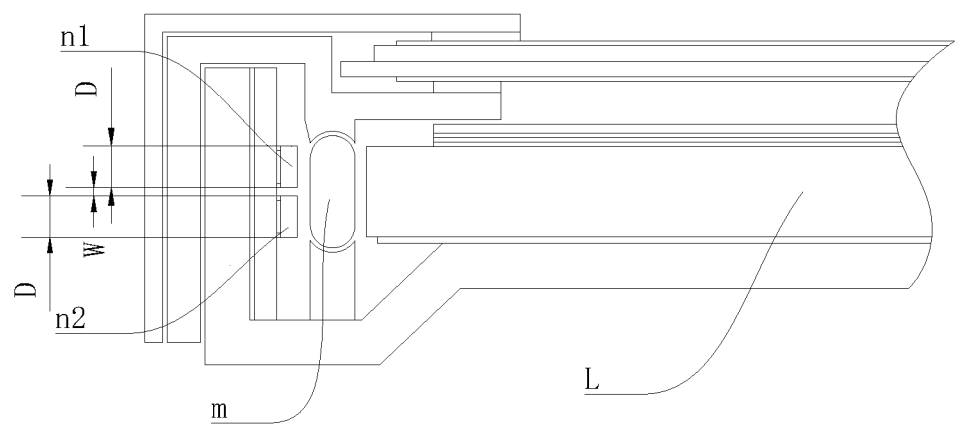
FIG. 1 is a schematic sectional diagram showing a conventional backlight module.
Figure 2:
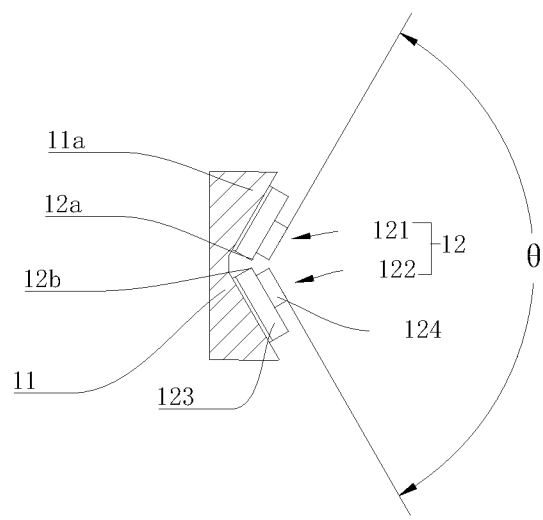
FIG. 2 is a schematic sectional diagram showing a lighting device according to an embodiment of the present invention.

As illustrated in FIG. 2, a lighting device 10 according to an embodiment of the present invention contains a substrate 11 and a number of rows of lighting elements 12 on a front side of the substrate 11. In the present embodiment, the lighting elements 12 are arranged in two parallel rows along the length of the substrate 11. The lighting elements 12 on a first row are denoted as 121 whereas the lighting elements 12 on a second row are denoted as 122. The lighting elements 121 of the first row are arranged along a first edge 12a adjacent to the lighting elements 122 of the second row.

The lighting elements 122 of the second row are arranged along a second edge 12b adjacent to the lighting elements 121 of the first row. The first and second edges 12a and 12b neighbor on each other. The front side of the substrate 11 is configured so that the first and second edges 12a and 12b are sunk backward into the substrate 11, and as such an included angle θ is formed between the lighting elements 121 and 122 of the first and second rows. The light produced by the lighting elements 121 and 122 therefore intersects. The angle θ is between 90 and 150 degrees and in the present embodiment the angle θ is 120 degree.

Preferably, the substrate 11 has an M-shaped cross-section. The lighting elements 121 and 122 are arranged on the substrate 11's two bulging shoulders 11a, respectively. Each lighting element 121 or 122 contains a base 123 and a LED lamp 124 on the base 123. The base 123 can be a printed circuit board (PCB) and the LED lamp 124 is configured on a shoulder 11a of the substrate 11 through the PCB.

It should be obvious that, in addition to the above arrangement, the interface between the lighting elements 121 or 122 and the substrate 11 can be a curved indentation (not shown) into the substrate 11, as long as the lighting elements 121 and 122 can form an included angle in-between.

In alternative embodiments, each lighting element can has the LED lamp directly configured on a shoulder of the substrate. In this case, the substrate can be PCB having the above describe shape.

Figure 3:
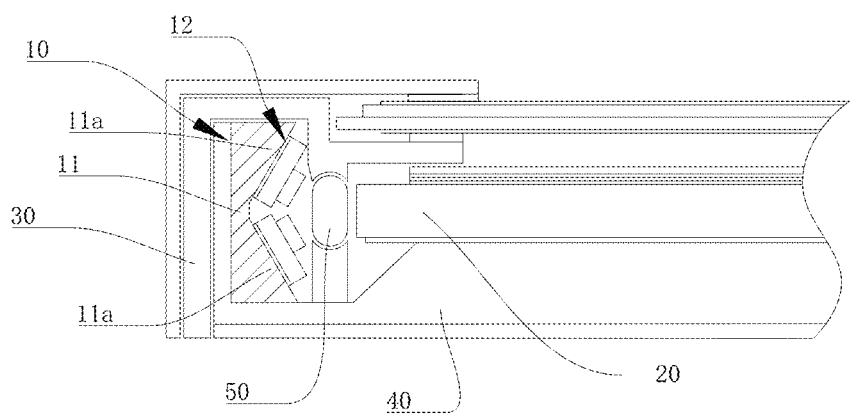
FIG. 3 is a schematic sectional diagram showing a backlight module according to an embodiment of the present invention.
Figure 4:
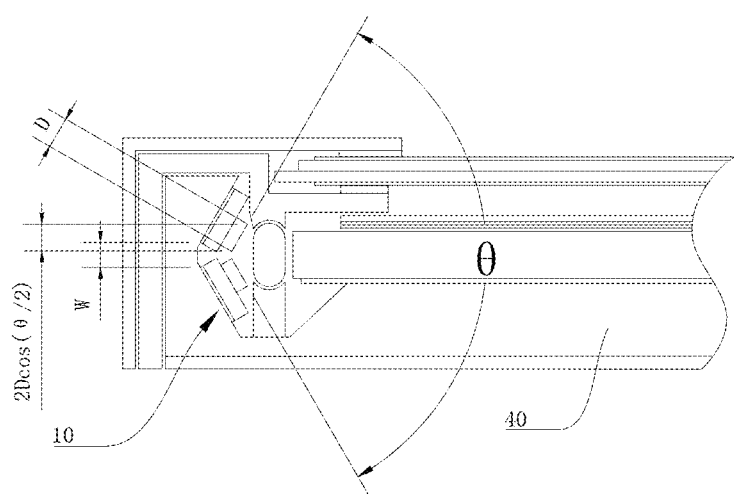
FIG. 4 is a schematic sectional diagram showing a backlight module according to another embodiment of the present invention.

The present invention also provides a backlight module incorporating the above described lighting device. As illustrated in FIG. 3, the backlight module contains a light guide plate 20, a plastic frame 30, a back plate 40 surrounding the light guide plate 20 and the plastic frame 30, a lighting device 10 configured on the back plate 40 facing a light incident plane of the light guide plate 20, and a QD tube 50 between the lighting device 10 and the light guide plate 20. As shown in FIG. 3, the lighting device 10 can be adhered a location on the back plate 40 corresponding to the incident plane of the light guide plate 20. Alternatively, as shown in FIG. 4, the substrate of the lighting device 10 and the back plate 40 are integrally formed. In other words, the back plate 40 provides a structure identical to the substrate of the lighting device at where the lighting device is configured.

Taking FIG. 4 as example, with an appropriate included angle between the two rows of lighting elements, the light from the lighting elements of the two rows intersects within the QD tube 50, and then enters the light guide plate 20 to provide a uniform planar illumination. Again assuming that each row of the lighting elements has a height D, and the gap between the two rows is W, the projection of the two rows of lighting elements onto an incident plane of the QD tube 50 is $2D \cos(\theta/2)+W$. Since the light from the lighting elements first intersects and then enters the light guide plate 20, the actual required thickness H' of the light guide plate 20's incident plane should be smaller than $2D \cos(\theta/2)+W$. In other words, with a lighting device of the present invention, the thickness of the light guide plate can be greatly reduced (i.e., H'<H). The QD tube could be thinner and lighter too. Therefore, a backlight module of the present invention not only provides high saturation and high chromaticity, but also achieves greater optical coupling efficiency, thinner light guide plate and QD tube, reduced material cost and dimension.

Embodiments of the present invention have been described, but not intending to impose any unduly constraint to the appended claims. Any modification of equivalent structure or equivalent process made according to the disclosure and drawings of the present invention, or any application thereof, directly or indirectly, to other related fields of technique, is considered encompassed in the scope of protection defined by the clams of the present invention.

What is claimed is:

1. A lighting device, comprising:
   a substrate; and
   a plurality of lighting elements on a front side of the substrate;
   wherein the lighting elements are arranged in at least two parallel rows along the length of the substrate; the lighting elements of a first row are arranged along a first edge adjacent to the lighting elements of a second row; the lighting elements of the second row are arranged along a second edge adjacent to the lighting elements of the first row; the first and second edges neighbor on each other; the front side of the substrate is configured so that the first and second edges are sunk backward into the substrate, and as such an included angle is formed between the lighting elements of the first and second rows; and the light produced by the lighting elements therefore intersects.

2. The lighting device as claimed in claim 1, wherein the included angle is between 90 and 150 degrees.

3. The lighting device as claimed in claim 1, wherein the substrate has an M-shaped cross-section.

4. The lighting device as claimed in claim 3, wherein the interface between the lighting elements and the substrate is a curved indentation into the substrate.

5. The lighting device as claimed in claim 3, wherein each lighting element comprises a base and a light emitting diode (LED) lamp configured on the base.

6. A backlight module, comprises contains a light guide plate, a plastic frame, a back plate surrounding the light guide plate and the plastic frame, a lighting device configured on the back plate facing a light incident plane of the light guide plate, and a QD tube between the lighting device and the light guide plate;
   wherein the lighting device comprises a substrate and a plurality of lighting elements on a front side of the substrate; the lighting elements are arranged in at least two parallel rows along the length of the substrate; the lighting elements of a first row are arranged along a first edge adjacent to the lighting elements of a second row; the lighting elements of the second row are arranged along a second edge adjacent to the lighting elements of the first row; the first and second edges neighbor on each other; the front side of the substrate is configured so that the first and second edges are sunk backward into the substrate, and as such an included angle is formed between the lighting elements of the first and second rows; and the light produced by the lighting elements therefore intersects.

7. The backlight module as claimed in claim 6, wherein the included angle is between 90 and 150 degrees.

8. The backlight module as claimed in claim 6, wherein the substrate has an M-shaped cross-section.

9. The backlight module as claimed in claim 8, wherein the interface between the lighting elements and the substrate is a curved indentation into the substrate.

10. The backlight module as claimed in claim 6, wherein each lighting element comprises a base and a light emitting diode (LED) lamp configured on the base; and the substrate and the back plate are integrally formed.

* * * * *